United States Patent
Kim et al.

(10) Patent No.: US 10,666,453 B2
(45) Date of Patent: May 26, 2020

(54) ELECTRONIC DEVICE AND METHOD OF CONTROLLING ELECTRONIC DEVICE

(71) Applicant: Samsung Electronics Co., Ltd., Gyeonggi-do (KR)

(72) Inventors: Yongwook Kim, Seoul (KR); Dongkyu Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 16/143,805

(22) Filed: Sep. 27, 2018

(65) Prior Publication Data

US 2019/0097831 A1   Mar. 28, 2019

(30) Foreign Application Priority Data

Sep. 28, 2017   (KR) .................... 10-2017-0126450

(51) Int. Cl.
*G07C 9/00* (2020.01)
*H04L 12/28* (2006.01)
(Continued)

(52) U.S. Cl.
CPC ............ *H04L 12/2823* (2013.01); *E06B 7/28* (2013.01); *G08B 21/18* (2013.01); *H04L 67/025* (2013.01);
(Continued)

(58) Field of Classification Search
CPC ............... H04L 12/2823; H04L 67/025; H04L 2012/2841; E06B 7/28; G08B 21/18; H04W 4/14
See application file for complete search history.

(56) References Cited

U.S. PATENT DOCUMENTS

| 9,292,985 | B2 * | 3/2016 | Ahearn | .............. G07C 9/00571 |
| 2006/0109966 | A1 | 5/2006 | Sasakura et al. | |

(Continued)

FOREIGN PATENT DOCUMENTS

| KR | 10-0974792 B1 | 8/2010 |
| KR | 10-2013-0080583 A | 7/2013 |

(Continued)

OTHER PUBLICATIONS

International Search Report dated Jan. 9, 2019.

*Primary Examiner* — Munear T Akki
(74) *Attorney, Agent, or Firm* — Cha & Reiter, LLC

(57) ABSTRACT

An electronic device is disclosed. The electronic device includes: a first communication unit and a second communication unit; a processor; and a memory, wherein the memory includes instructions causing the processor to control the first communication unit to receive first identification information for the door and first opening/closing state information of the door from a server, control the second communication unit to receive second communication unit to receive second door identification information and second opening/closing state information of the door from a door, and identify information on an electronic device involved in a change in an opening/closing state of the door based on the first identification information for the door, the first opening/closing state information of the door, the second door identification information, and the second opening/closing state information of the door. Other various embodiments are possible.

13 Claims, 9 Drawing Sheets

(51) Int. Cl.
*H04W 4/14* (2009.01)
*E06B 7/28* (2006.01)
*H04L 29/08* (2006.01)
*G08B 21/18* (2006.01)

(52) U.S. Cl.
CPC ....... *H04W 4/14* (2013.01); *H04L 2012/2841* (2013.01)

(56) References Cited

U.S. PATENT DOCUMENTS

| | | | | |
|---|---|---|---|---|
| 2006/0170533 | A1* | 8/2006 | Chioiu | G07C 9/00103 340/5.61 |
| 2007/0290789 | A1* | 12/2007 | Segev | E05B 47/0657 340/5.6 |
| 2011/0053557 | A1* | 3/2011 | Despain | A47G 29/10 455/410 |
| 2014/0340196 | A1* | 11/2014 | Myers | G07C 9/00309 340/5.61 |
| 2017/0294061 | A1 | 10/2017 | Shin et al. | |

FOREIGN PATENT DOCUMENTS

| | | |
|---|---|---|
| KR | 10-2015-0041939 A | 4/2015 |
| KR | 10-2016-0131676 A | 11/2016 |
| KR | 10-2016-0146128 A | 12/2016 |
| KR | 10-1707837 B1 | 2/2017 |

\* cited by examiner

FIG. 2
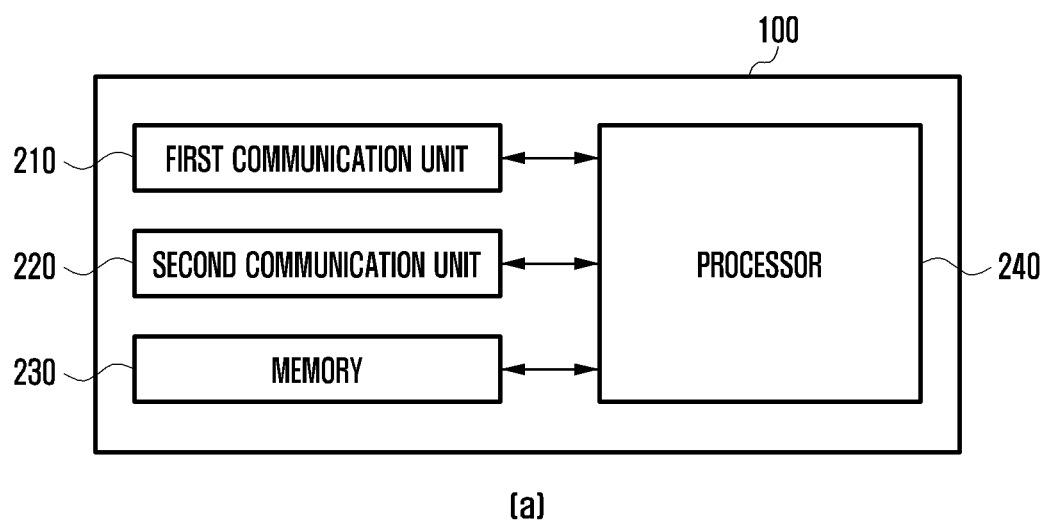
(a)
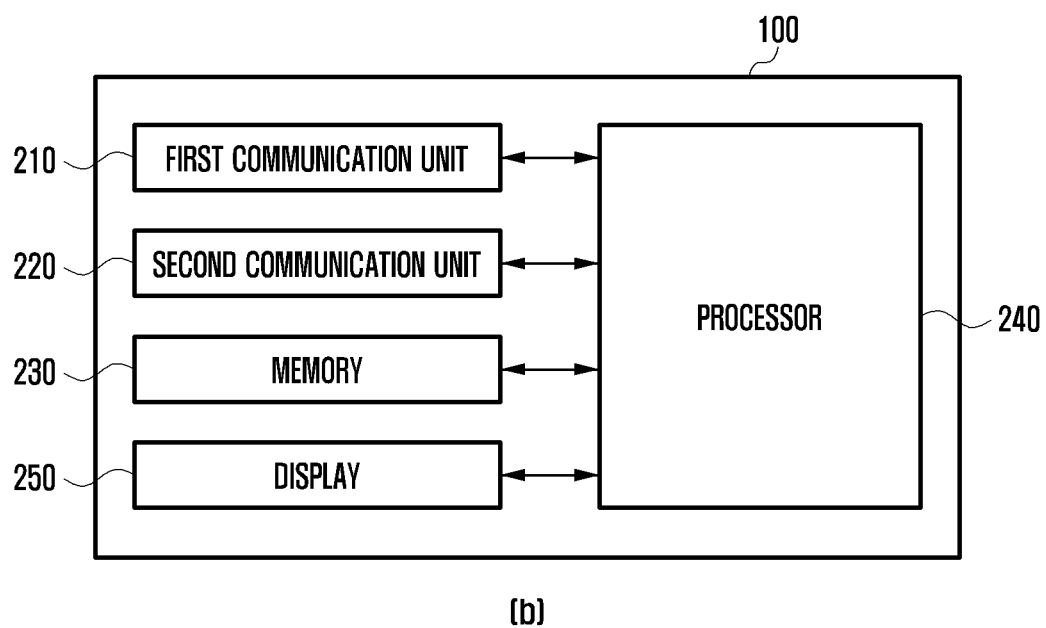
(b)

ELECTRONIC DEVICE AND METHOD OF CONTROLLING ELECTRONIC DEVICE

CROSS-REFERENCE TO RELATED APPLICATION(S)

This application is based on and claims priority under 35 U.S.C. § 119 to Korean Patent Application No. 10-2017-0126450, filed on Sep. 28, 2017, in the Korean Intellectual Property Office, the disclosure of which is incorporated by reference herein in its entirety.

BACKGROUND

1) Field

The present disclosure relates to an electronic device and a method of controlling an electronic device and, more particularly, to technology for controlling an electronic device which generates a notification of a change in an opening/closing state of a door through a link with the door and a server.

2) Description of Related Art

The above information is presented as background information only to assist with an understanding of the present disclosure. No determination has been made, and no assertion is made, as to whether any of the above might be applicable as prior art with regard to the present disclosure.

As various electronic devices such as smart phones, tablet Personal Computers (PCs), Portable Multimedia Players (PMPs), Personal Digital Assistants (PDAs), laptop PCs, and wearable devices are distributed, various user-convenient functions have been provided.

A particularly user-convenient function is the ability to remotely monitor the environment in a user's home.

SUMMARY

A function of receiving a notification of a change in an opening/closing state of a door through a link with the door and a server can be provided. For example, a user registers an electronic device to receive a notification of a change in an opening/closing state of the door in the server and the electronic device may receive the notification of the change from the server when the opening/closing state of the door is changed.

Through reception of a change in an opening/closing state of a door by an electronic device, all registered electronic devices receive the notification whenever the opening/closing state of the door is changed, which is inefficient in that an electronic device of a user who actually opens/closes the door receives the notification. If the user, themselves opened or closed the door, a notification of the same is of little use, and wastes resources.

In accordance with an aspect of the present disclosure, an electronic device is provided. The electronic device includes: a first communication unit and a second communication unit; a processor; and a memory, wherein the memory includes instructions causing the processor to control the first communication unit to receive first identification information for the door and first opening/closing state information of the door from a server, control the second communication unit to receive second communication unit to receive second door identification information and second opening/closing state information of the door from a door, and identify information on an electronic device involved in a change in an opening/closing state of the door based on the first identification information for the door, the first opening/closing state information of the door, the second door identification information, and the second opening/closing state information of the door.

In accordance with another aspect of the present disclosure, a server is provided. The server includes: a communication unit; a processor; and a memory, wherein the memory includes instructions causing the processor to control the communication unit to receive first identification information for the door and first opening/closing state information of the door from a door, and control the communication unit to transmit the first identification information for the door and the first opening/closing state information of the door to at least one electronic device configured to receive a notification of a change in an opening/closing state of the door when the first identification information for the door and the first opening/closing state information of the door are received.

In accordance with another aspect of the present disclosure, a door is provided. The door includes: a first communication unit and a second communication unit; a sensor unit configured to sense a change in an opening/closing state of the door; a memory configured to store door identification information and door opening/closing state information of the door; and a processor, wherein the memory includes instructions causing the processor to control the first communication unit to transmit the door identification information and the door opening/closing state information to a server when the opening/closing state of the door is changed, and perform control to change a deactivated state of the second communication unit to an executed state according to the change in the opening/closing state of the door.

In accordance with another aspect of the present disclosure, a control method of an electronic device is provided. The control method includes: receiving first identification information for the door and first opening/closing state information of the door from an external server through a first communication unit; receiving second door identification information and second opening/closing state information of the door from an external door through a second communication unit; and identifying information on an electronic device involved in a change in an opening/closing state of a door based on the first identification information for the door and the first opening/closing state information of the door received through the first communication unit and the second door identification information and the second opening/closing state information of the door received through the second communication unit.

According to an embodiment of the present disclosure, it is possible to reduce inefficiency in which all electronic devices receive a notification whenever a change in an opening/closing state of a door is made by identifying information on an electronic device of a user who opened/closed the door and not transmitting the notification to the corresponding electronic device.

According to an embodiment of the present disclosure, when a user who has not been registered to receive a notification of an opening/closing state of a door opens the door, it is possible to recognize door opening/closing by the non-registered user.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 2 is a block diagram schematically illustrating an electronic device according to an embodiment;

DETAILED DESCRIPTION

Figure 1:
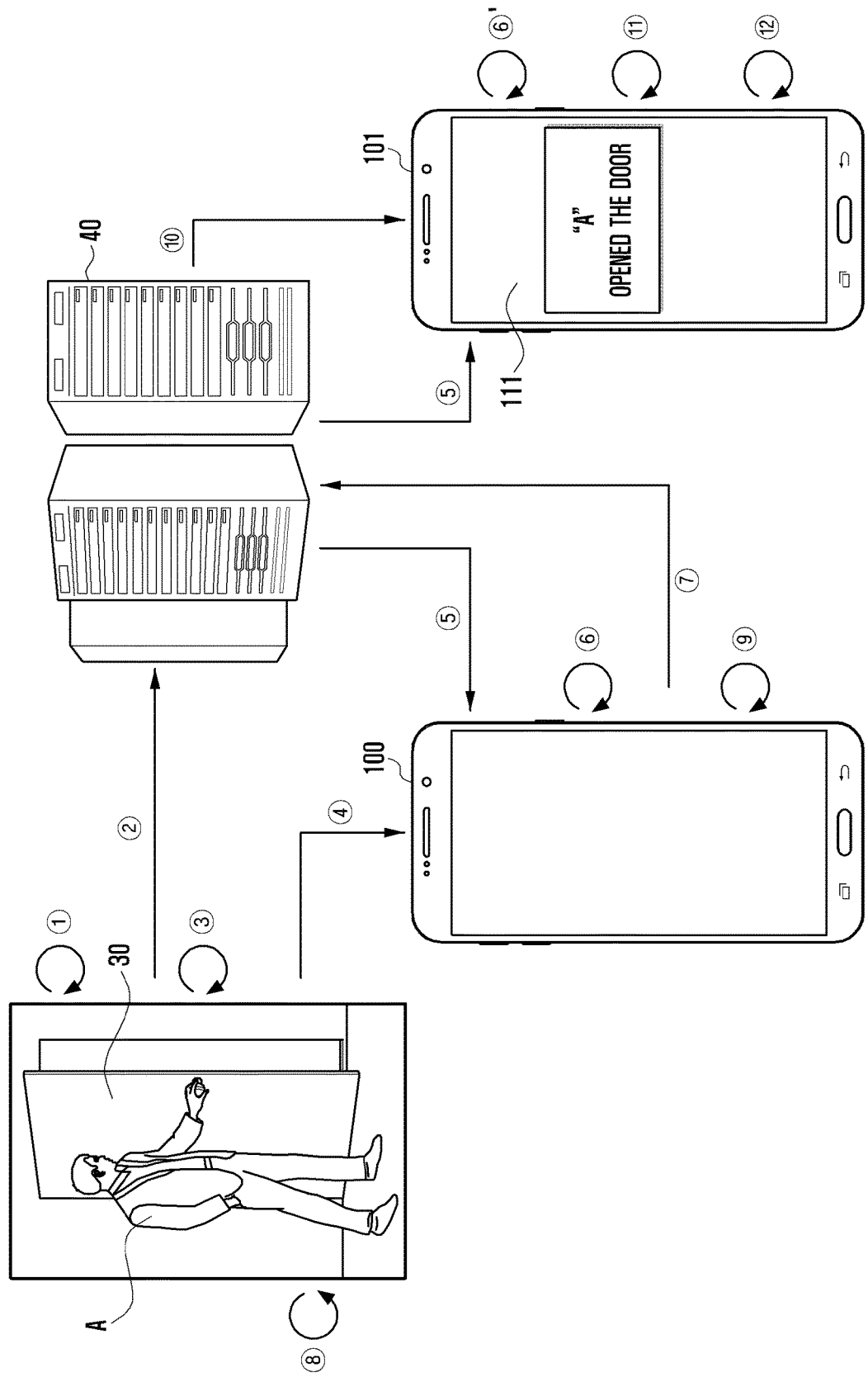
FIG. 1 illustrates a situation in which information on an electronic device related to a door of which an opening/closing state is changed is identified and transmitted to a server through a link between the electronic device, the door, and the server according to an embodiment.

An electronic device according to various embodiments disclosed herein may be various types of devices. The electronic device may, for example, include at least one of a portable communication device (e.g., smartphone) a computer device, a portable multimedia device, a portable medical device, a camera, a wearable device, and a home appliance. The electronic device according to one embodiment of the present disclosure is not limited to the above described devices.

The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. The terms "A or B", "one or more of A and/or B", "A, B, or C", or "one or more of A, B and/or C" may include all possible combinations of them. The expression "a first", "a second", "the first", or "the second" used in various embodiments of the present disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

Hereinafter, various embodiments of the present disclosure will be described with reference to the accompanying drawings.

In certain embodiments, a door includes a sensor for sensing whether the door state changes, such as opened when previously shut or shut, when previously opened. The door also includes communication unit for short-range communication and a communication unit for long-distance communication. When the door state changes, the long-distance communication unit transmits a notification of the event to a server and the short-range communication unit broadcasts a notification of the event. The users associated with the electronic devices that receive the short-range communication are deemed to have caused the change in the door state. The electronic device that receive the short-range communication transmit notify the server. The server then transmits a signal to all of the other registered devices, excluding the electronic devices that are deemed to have caused the change in the door state.

FIG. 1 illustrates changing information on an electronic device related to a door of which an opening/closing state is changed. The changed information is identified and transmitted to a server through a link between the electronic device, the door, and the server according to an embodiment Electronic devices 100 and 101, a door 30, and a server 40 may be mutually linked with each other and included in a door opening/closing state notification system. In the door opening/closing state notification system a notification of a change in an opening/closing state of the door is generated and exchanged. However, the present disclosure is not limited thereto, and various devices such as an access point and a hub may be further included in the door opening/closing notification system.

The electronic device 100 may include at least one of, for example, a portable communication device (for example, a smart phone), a portable multimedia device, a camera, and a wearable device.

According to an embodiment, the electronic device 100 may use a plurality of communication methods. For example, the electronic device 100 may communicate with the server 40 through a first communication method enabling long-distance communication (such as cellular communication) and communicate with the door 30 through a second communication method enabling short-range communication (such as NFC, Bluetooth, and Wi-Fi).

The server 40 may directly establish a network with the electronic device 100 and the door 30. However, the present disclosure is not limited thereto, and they may be connected through a third device (for example, an Access Point (AP), a relay, a router, a gateway, or a hub).

The door 30 may detect an opening/closing state through, for example, a magnetic field sensor included in the door 30. Further, the door 30 may establish a network with the electronic device 100 and the server 40 through, for example, an Internet of Things (IoT) device included in the door 30. The IoT device and the magnetic field sensor may be configured as a single module and included in the door 30. For example, in certain embodiments, a magnet may be placed at the moving edge of the door and a magnetic field sensor may be placed on the frame, or vice versa, such that the magnet is in proximity of to the magnetic field sensor when the door is closed.

According to an embodiment, the door 30 may use a plurality of communication methods through the IoT device included therein. For example, the door 30 may perform wireless communication with the server 40 through the first communication method enabling long-distance communication and perform wireless communication with the electronic device 100 through the second communication method enabling short-range communication.

According to an embodiment, the door 30, and the sensor and IoT device, which detect the opening/closing state, may be configured in an integrated form. However, the present disclosure is not limited thereto, and the sensor or the IoT device, which detects the opening/closing state, may be added to a part of the door 30. Hereinafter, it is assumed that the door 30, and the sensor and the IoT device, which detect the opening/closing state, are configured in an integrated form.

An operation method of the door opening/closing notification system will be described with reference to FIG. 1.

In operation ①, the door 30 may sense a change in an opening/closing state thereof by a user. While the door 30 is shut, someone may open the door. Alternatively, while the door 30 is open, someone may shut the door. For example, the door 30 may sense the change in the opening/closing state thereof through a magnetic field sensor included in the door 30.

In operation ②, the door 30 may transmit information (for example, door identification information or door opening/closing state information) related to the change in the opening/closing state thereof to the server 40. For example, the door 30 may transmit first identification information for the door and first opening/closing state information of the door to the server 40 by using a first communication unit capable of performing the first communication method enabling long-distance communication.

The door identification information may include at least one of various pieces of information, for example, an Identification (ID) number, a manufacturer serial number, and a name for identifying the door 30.

The door opening/closing state information may include at least one of, for example, information indicating whether the door 30 is currently open or closed, a change in an opening/closing state of the door 30 (for example, a change from a closing state to an opening state or a change from an opening state to a closing state), and a time during which the current state is maintained.

In operation ③, the door 30 may use a second communication unit which has been in a deactivated state. For example, the door 30 may use the second communication unit capable of performing the second communication method in response to generation of the change in the opening/closing state of the door 30 in operation ①.

According to various embodiments, the deactivated state may include, for example, at least one of an off state, powered down, and a sleep mode state. In certain embodiments, the deactivated state can include disconnection of the portion of the module that provides the power to generate radio waves. Further, executing may mean that a change from a deactivated state to an activated state. The activated state may include, for example, at least one of an on state and a wake-up mode state.

In operation ④, the door 30 may transmit second door identification information and second opening/closing state information of the door to the electronic devices 100 and 101 through the second communication method.

In the present disclosure, the first identification information for the door, the first opening/closing state information of the door, the second door identification information, and the second opening/closing state information of the door may be information having the same content but separate according to a difference in the communication method used for transmitting information by the door 30

For example, door identification information and door opening/closing state information which the door 30 transmits through the first communication method may correspond to the first identification information for the door for the door and the first opening/closing state information of the door of the door, and door identification information and door opening/closing state information which the door 30 transmits through the second communication method may correspond to the second identification information for the door and the second opening/closing state information of the door of the door.

However, the present disclosure is not limited thereto. For example, according to various embodiments, door identification information and door opening/closing state information which the electronic device 100 receives from the server 40 may correspond to the first identification information for the door for the door, and the first opening/closing state information of the door of the door, and door identification information and door opening/closing state information which the electronic device 100 receives from the door 30 may correspond to the second identification information for the door and the second opening/closing state information of the door of the door.

As described above, the second communication method may be a short-range communication method. Accordingly, when the electronic devices 100 and 101 approaches the door 30 within a preset range, the electronic devices 100 and 101 may receive the second identification information for the door and the second opening/closing state information of the door of the door from the door 30. For example, when the second communication method is a short-range communication method (beacon) using Low Energy Bluetooth, the door 30 may transmit information approximately within a range of radius 50 to 70 m.

In this case, the electronic device 100 is located within the preset range and may receive the second identification information for the door and the second opening/closing state information of the door from the door 30, but the other electronic device 101 is not located within the preset range from the door 30 and may not receive the second identification information for the door nor the second opening/closing state information of the door from the door 30.

In operation ⑤, the server 40 may transmit the received first identification information for the door and first opening/closing state information of the door to the pre-registered electronic devices 100 and 101. The pre-registered electronic devices 100 and 101 may be electronic devices that receive information on a change in an opening/closing state of the door 30 and are registered in the server 40 in advance.

In operations ⑥, the electronic devices 100 and 101 may execute the second communication unit which has been in a deactivated state. For example, the electronic devices 100 and 101 may execute the second communication unit which can perform the second communication method in response to reception of the first identification information for the door and the first opening/closing state information of the door from the server 40.

In operation ⑦, the electronic device 100 may generate door state information on the basis of the first identification information for the door and the first opening/closing state information of the door received from the server 40 and the second identification information for the door and the second opening/closing state information of the door received from the door 30 and transmit the generated door state information to the server 40.

The door state information is information for identifying an electronic device involved in the change in the opening/ closing state of the door, and may include, for example, at least one of information (for example, electronic device identification information) on an electronic device of a user who changes an opening/closing state of the door and an opening/closing state of the door (for example, an opening state or a closing state).

For example, the electronic device 100 may compare the first identification information for the door and the first opening/closing state information of the door received from the server 40 with the second identification information for the door and the second opening/closing state information of the door received from the door 30 to determine whether the pieces of information are the same. When pieces of the information received from the server 40 are the same as pieces of the information received from the door 30, the electronic device 100 may generate door state information using a user's name pre-stored in the electronic device 100. For example, when the user name of the electronic device 100 is pre-stored as "A", the electronic device 100 may generate door state information including identification information of the door of which the opening/closing state is changed and the user name (for example, "A") of the electronic device involved in the change in the opening/closing state of the door, and transmit the generated door state information to the server 40.

In operation ⑧, the door 30 may change the state of the second communication unit to a deactivated state. For example, the door 30 may transmit the second identification information for the door and the second opening/closing state information of the door during a preset time (for example, for 1 to 2 minutes) through the second communication method and then end the transmission, and change the state of the second communication unit to the deactivated state.

In operation ⑨, the electronic device 100 may change the state of the second communication unit to the deactivated state. For example, the electronic device 100 may change the state of the second communication unit to the deactivated state after transmitting the door state information to the server 40.

In operation ⑩, the server 40 may generate door state notification information indicating the content of the change in the opening/closing state of the door on the basis of the door state information received from the electronic device 100. The server 40 may identify an electronic device to receive the door state notification information among preset electronic devices to receive the door state notification information when the opening/closing state of the door is changed and transmit the door state notification information to the identified electronic device.

For example, when the opening/closing state of the door 30 is changed and the electronic device 100 and the other electronic device 101 are configured to receive a notification from the server 40, if door state information indicating that the user (for example, "A") of the electronic device 100 opens/closes the door 30 is generated, the server 40 may transmit the door state notification information to the other electronic device 101 without transmitting it to the electronic device 100.

In operation ⑪, the other electronic device 101 may display a notification indicating the state of the door 30 on a display 111 on the basis of the door state notification information received from the server 40. For example, the other electronic device 101 may display the notification "A" opened the door" on the display 111.

In operation ⑫, the other electronic device 101 may change the state of the second communication unit to the deactivated state after receiving the door state notification information from the server 40.

According to various embodiments, the door opening/closing notification system may include a plurality of doors (for example, a first door and a second door). In this case, the electronic device 100 may generate identification information of each door (for example, the first door or the second door) included in the door state information.

As described above, according to an embodiment of the present disclosure, the server 40 may identify the electronic device of the user who opens/closes the door, thereby removing the inefficiency in which the notification of the opening/closing state of the door is transmitted to all electronic devices registered in advance. Further, it is possible to induce efficient power operation of the door 30 and the electronic device 100 by performing a short-range wireless communication method in a particular situation such as the change in the opening/closing state of the door 30.

FIGS. 2(a) and 2(b) are block diagrams schematically illustrating an electronic device according to an embodiment.

Referring to FIG. 2(a), the electronic device 100 may include a first communication unit 210, a second communication unit 220, a memory 230, and a processor 240. However, the present disclosure is not limited thereto. For example, the electronic device 100 may omit at least one of the above-mentioned elements or further include other elements.

The first communication unit 210 and the second communication unit 220 may establish a wired or wireless communication channel between the electronic device 100, the door 30, and the server 40, and support communication through the established communication channel.

The first communication unit 210 and the second communication unit 220 may include, for example, a cellular module, a Wi-Fi module, a Bluetooth module, a GNSS module, an NFC module, and an RF module. The cellular module may provide a voice call, a video call, a text message service, or an Internet service through, for example, a communication network. According to an embodiment, the cellular module may identify and authenticate the electronic device 100 within a communication network using a subscriber identification module (for example, a SIM card). According to an embodiment, the cellular module may perform at least some of the functions which the processor 240 may provide. According to an embodiment, the cellular module may include a Communication Processor (CP). According to some embodiments, at least a part (for example, two or more) of the cellular module, the Wi-Fi module, the Bluetooth module, the GNSS module, and the NFC module may be included in one Integrated Chip (IC) or in an IC package. The RF module may transmit/receive, for example, a communication signal (for example, an RF signal). The RF module may include, for example, a transceiver, a power amp module (PAM), a frequency filter, a low noise amplifier (LNA), an antenna, or the like. According to another embodiment, at least one of the cellular module, the Wi-Fi module, the Bluetooth module, the GNSS module, and the NFC module may transmit/receive an RF signal through a separate RF module. The subscriber identification module may include, for example, a card that includes a subscriber identification module, or an embedded SIM, and may contain unique identification information (for example, an integrated circuit card identifier (ICCID)) or subscriber information (for example, international mobile subscriber identity (IMSI)).

According to an embodiment, the first communication unit 210 may perform long-distance wireless communication among the above communication methods, and the second communication unit 220 may perform short-range communication among the above communication methods. Accordingly, the first communication method described in FIG. 1 is the long-distance wireless communication method using the first communication unit 210, and the second communication method is the short-range wireless communication method using the second communication unit 220.

The memory 230 may include, for example, an internal memory or an external memory. The internal memory may include, for example, at least one of a volatile memory (for example, a DRAM, an SRAM, an SDRAM, or the like) and a non-volatile memory (for example, a One Time Programmable ROM (OTPROM), a PROM, an EPROM, an EEPROM, a mask ROM, a flash ROM, a flash memory, a hard disc drive, or a Solid State Drive (SSD)). The external memory may include a flash drive, for example, a compact flash (CF), a secure digital (SD), a Micro-SD, a Mini-SD, an eXtreme digital (xD), a multi-media card (MMC), a memory stick, and the like. The external memory may be functionally or physically connected to the electronic device 100 through various interfaces.

According to an embodiment, the memory 230 may store various pieces of data used by at least one element (for example, the processor 240) of the electronic device 100, for example, input data or output data for software and instructions related thereto.

The processor 240 may include one or more of a central processing unit, an application processor, a Graphic Processing Unit (GPU), a camera image signal processor, and a Communication Processor (CP). According to an embodiment, the processor 240 may be implemented in System on Chip (SoC) or System in Package (SiP). The processor 240 may control at least one other element (for example, hardware or software element) of a data learning server (DS) connected to the processor 240 and perform various data processing and calculations by executing, for example, operating system or applications. The processor 240 may load instructions or data received from other elements (for example, the first communication unit 210 or the second communication unit 220) in volatile memory, process the loaded instructions or data, and store resultant data in non-volatile memory.

The processor 240 according to an embodiment may identify information on an electronic device involved in the change in the opening/closing state of the door 30 by comparing the first identification information for the door and the first opening/closing state information of the door received from the server 40 with the second identification information for the door and the second opening/closing state information of the door received from the door 30.

Referring to FIG. 2(b), the electronic device 100 may include the first communication unit 210, the second communication unit 220, the memory 230, the processor 240, and a display 250.

Since the first communication unit 210, the second communication unit 220, the memory 230, and the processor 240 of FIG. 2(b) may perform the same functions as those of the first communication unit 210, the second communication unit 220, the memory 230, and the processor 240 of FIG. 2(a), hereinafter the description of the display 250 will be made.

The display 250 may include a panel and/or a control circuit for controlling the panel. The panel may be implemented to be, for example, flexible, transparent, or wearable. The panel may include a touch panel and one or more modules. According to an embodiment, the panel may include a pressure sensor (or a force sensor) for measuring a strength of pressure of a user's touch. The pressure sensor may be implemented in an integrated type with the touch panel, or implemented as one or more sensors separated from the touch panel.

According to an embodiment, the display 250 may display door state notification information received from the server 40 under a control of the processor 240.

Figure 3:
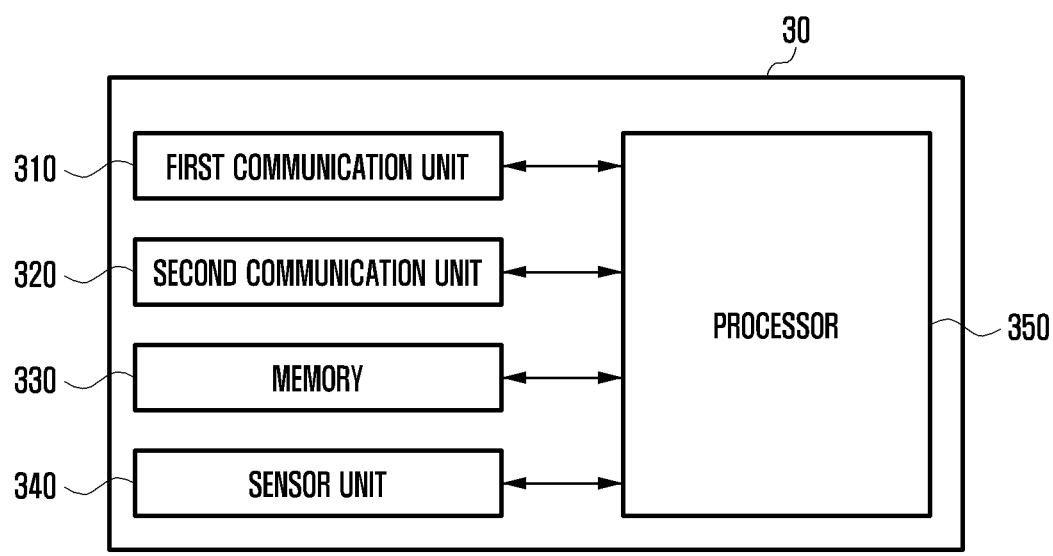
FIG. 3 is a block diagram schematically illustrating a door according to an embodiment.

FIG. 3 is a block diagram schematically illustrating a door according to an embodiment.

Referring to FIG. 3, the door 30 may include a first communication unit 310, a second communication unit 320, a memory 330, a sensor unit 340, and a processor 350. However, the present disclosure is not limited thereto. For example, the door 30 may omit at least one of the above-mentioned elements or further include other elements.

The first communication unit 310 and the second communication unit 320 may establish a wired or wireless communication channel between the electronic device 100, the door 30, and the server 40, and support communication through the established communication channel.

According to an embodiment, the first communication unit 310 may perform long-distance wireless communication, and the second communication unit 320 may perform short-range wireless communication.

The memory 330 may store various pieces of data. The memory 330 according to an embodiment may store information related to the door 30. For example, the memory 330 may store door identification information and door opening/closing state information. The door identification information may include at least one of various pieces of information, for example, an Identification (ID) number, a serial number, and a name for identifying the door 30. The door opening/closing state information may include at least one of, for example, information on whether the door 30 is currently in an opening state or a closing state, a change in the opening/closing state of the door 30 (for example, a change from the closing state to the opening state or from the opening state to the closing state), and a time during which the current state is maintained.

A sensor unit 340 may measure, for example, a physical quantity or detect a state of the door 30, and convert measured or detected information into an electric signal. The sensor unit 340 may include, for example, a gesture sensor, a gyro sensor, a magnetic field sensor, and an acceleration sensor.

According to an embodiment, the sensor unit 340 may detect the state of the door. For example, the sensor unit 340 may detect the state of the door (for example, at least one of a closing state, an opening state, and a changing state between the closing state and the opening state) on the basis of a change in the magnetic field.

The processor 350 may correspond to, for example, a microcomputer. The processor 350 may store a result value of sensing performed by the sensor unit 340 in the memory 330 or transmit the result value to an external device through the first communication unit 310 and the second communication unit 320.

Figure 4:
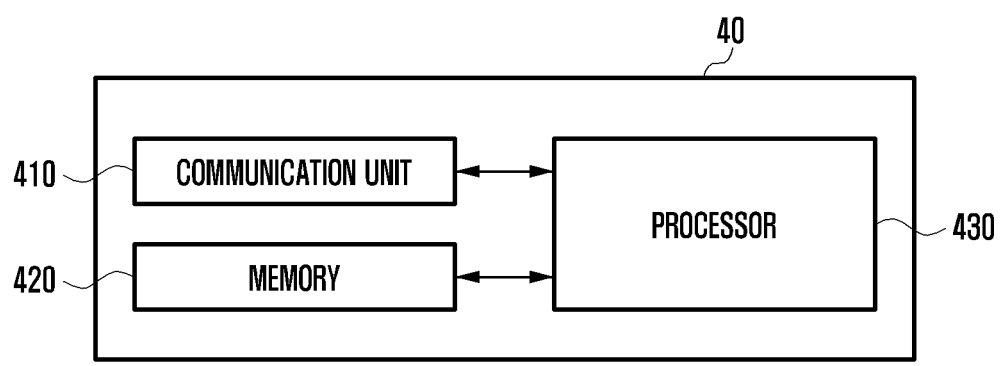
FIG. 4 is a block diagram schematically illustrating a server according to an embodiment.

FIG. 4 is a block diagram schematically illustrating a server according to an embodiment.

Referring to FIG. 4, the server 40 may include a communication unit 410, a memory 420, and a processor 430. However, the present disclosure is not limited thereto. For example, the server 40 may omit at least one of the above-mentioned element or further include other elements.

The communication unit 410 may establish a wired or wireless communication scheme between the electronic device 100, the door 30, and the server 40 and perform communication through the established communication channel.

The memory 420 according to an embodiment may store, for example, various pieces of data used by the processor 430 or input or output data for instructions related to the various pieces of data.

For example, the memory 420 may store identification information of the electronic device to receive a notification according to identification information of the door and a change in the opening/closing state of the door.

The processor 430 according to an embodiment may control, for example, other elements of the server 40 connected to the processor 430 and perform various data processing and calculations by executing software stored in the memory 420.

For example, the processor 430 may control the communication unit 410 to transmit the first identification information for the door and the first opening/closing state information of the door received from the door 30 to electronic devices that form a network. Further, the processor 430 may generate door state notification information indicating the content of the change in the opening/closing state of the door on the basis of the door state information received from the electronic device and control the communication unit 410 to transmit the generated door state notification information to the electronic device.

Figure 5:
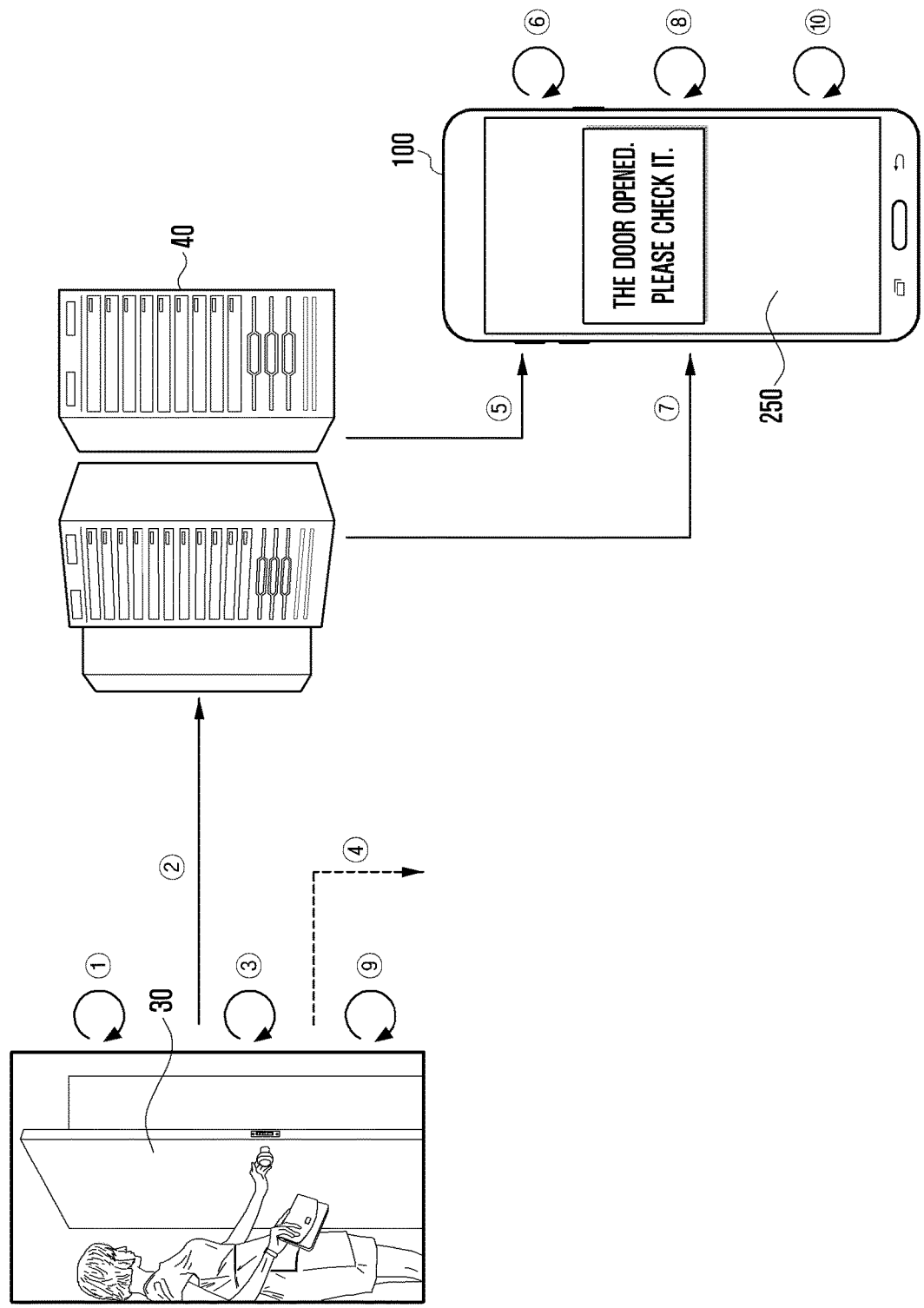
FIG. 5 illustrates informing of a situation in which door opening/closing is performed by a user who has not been registered through a link between the electronic device, the door, and the server according to an embodiment.

FIG. 5 illustrates informing of a situation in which door opening/closing is performed by a user who has not been registered through a link between the electronic device, the door, and the server according to an embodiment.

Referring to FIG. 5, the electronic device 100 is located away from the door 30 by a preset distance or longer and thus has a difficulty in performing short-range wireless communication with the door 30.

In operation ①, the door 30 may sense a change in the opening/closing state of the door 30. For example, the door 30 may sense the change in the opening/closing state of the door through a magnetic field sensor included in the door 30.

In operation ②, the door 30 may transmit information related to the change in the opening/closing state of the door to the server 40. For example, the door 30 may transmit first identification information for the door and first opening/closing state information of the door to the server 40 by executing a first communication unit capable of performing the first communication method enabling long-distance communication.

In operation ③, the door 30 may execute a second communication unit which has been in a deactivated state. For example, the door 30 may execute the second communication unit capable of performing the second communication method in response to generation of the change in the opening/closing state of the door 30 in operation ①.

In operation ④, the door 30 may transmit the second identification information for the door and the second opening/closing state information of the door to the electronic device 100 through the second communication method. As described above, the second communication method may be a short-range communication method. Accordingly, in this case, the electronic device 100 cannot approach the door 30 within a preset range, and thus cannot receive door identification information nor door opening/closing information from the door 30.

In operation ⑤, the server 40 may transmit the received first identification information for the door and first opening/closing state information of the door to all pre-registered electronic devices. The pre-registered electronic devices may be, for example, all electronic devices that receive information on the change in the opening/closing state of the door and are registered in the server 40 in advance.

In operation ⑥, the electronic device 100 may perform the second communication method that has not been executed. For example, the electronic device 100 may execute the second communication unit which can perform the second communication method in response to reception of the first identification information for the door and the first opening/closing state information of the door from the server 40.

In operation ⑦, the server 40 may generate door state notification information and transmit the generated door state notification information to the electronic device 100. For example, after receiving the first identification information for the door and the first opening/closing state information of the door from the door 30, the server 40 may wait for receiving the door state information from the electronic device 100 during a preset time.

For example, after receiving the first identification information for the door and the first opening/closing state information of the door from the door 30, the server 40 may wait for receiving the door state information from the electronic device 100 for 1 to 2 minutes. When the door state information is not received from the electronic device 100 even after the preset time passes, the server 40 may identify that the opening/closing state of the door 30 is changed by a user, who has not been registered, generate door state notification information corresponding to the door opening/closing by the non-registered user, and transmit the generated door state notification information to the electronic device 100.

In operation ⑧, the electronic device 100 may display a notification indicating the state of the door 30 on the display 250 through the door state notification information received from the server 40. For example, the electronic device 100 may display the notification "The door opened. Please, check it." on the display 250.

In operation ⑨, the door 30 may change the state of the second communication unit to the deactivated state.

In operation ⑩, the electronic device 100 may change the state of the second communication unit to the deactivated state after receiving the door state notification information from the server 40.

As described above, according to various embodiments of the present disclosure, the server 40 may identify the change in the opening/closing state of the door by the non-registered user, transmit door state notification information by the non-registered user to pre-registered electronic devices, thereby assisting in security of the user registering the electronic device and the door in the door opening/closing notification system and using the door opening/closing notification system.

Figure 6:
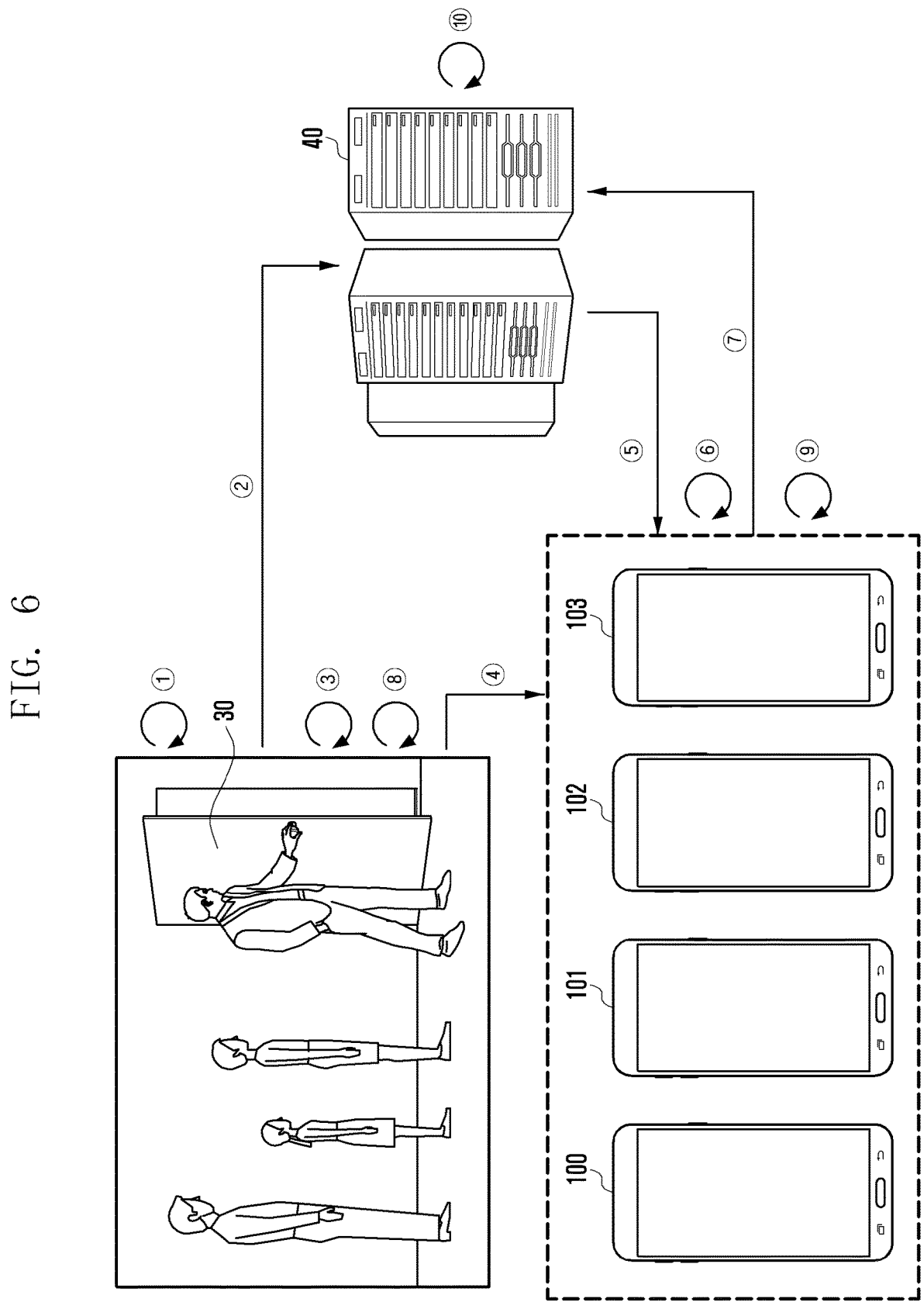
FIG. 6 illustrates a satiation in which a notification is limited when a door is opened/closed by all registered users through a link between the electronic device, the door and, the server according to an embodiment.

FIG. 6 illustrates a notification that is limited when a door is opened/closed by all registered users through a link between the electronic device, the door and, the server according to an embodiment.

According to various embodiments, FIG. 6 illustrates a situation in which users possessing electronic devices 100, 101, 102, and 103. The electronic devices 100, 101, 102, and 103 are configured to receive a notification when an opening/closing state of the door 30 is changed open/close the door 30 together.

In operation ①, the door 30 may sense a change in an opening/closing state of the door 30 by a user. For example, the door 30 may sense the change in the opening/closing state of the door through a magnetic field sensor included in the door 30.

In operation ②, the door 30 may transmit information related to the change in the opening/closing state of the door to the server 40. For example, the door 30 may transmit first identification information for the door and first opening/closing state information of the door to the server 40 by executing a first communication unit capable of performing the first communication method enabling long-distance communication.

In operation ③, the door 30 may activate a second communication unit which has been in a deactivated state. For example, the door 30 may activate the second communication unit capable of performing the second communication method in response to generation of the change in the opening/closing state of the door 30 in operation ①.

In operation ④, the door 30 may transmit second identification information for the door and second opening/closing state information of the door to the electronic devices 100, 101, 102, and 103 through the second communication method. As described above, the second communication method may be a short-range communication method. Accordingly, when the electronic devices 100, 101, 102, and 103 approach the door 30 within a preset range, the electronic devices 100, 101, 102, and 103 may receive door identification information and door opening/closing information from the door 30.

In this case, all the electronic devices 100, 101, 102, and 103 pre-configured to receive information on the opening/closing state of the door 30 from the server 40 are located with a preset distance from the door 30. Accordingly, the electronic devices 100, 101, 102, and 103 may all receive second identification information for the door and second opening/closing state information of the door from the door 30.

In operation ⑤, the server 40 may transmit the received first identification information for the door and first opening/closing state information of the door to pre-registered electronic devices 100, 101, 102, and 103. The pre-registered electronic devices 100, 101, 102, and 103 may be, for example, electronic devices that receive information on the state of the opening/closing state of the door 30 and are registered in the server 40 in advance.

In operation ⑥, the electronic devices 100, 101, 102, 103 may activate the second communication unit, which has been in the deactivated state. For example, the electronic devices 100 . . . 103 may activate the second communication unit, which has been in the deactivated state in response to reception of the first identification information for the door and the first opening/closing state information of the door from the server 40.

In operation ⑦, the electronic devices 100, 101, 102, and 103 may generate door state information on the basis of the first identification information for the door and the first opening/closing state information of the door received from the server 40 and second identification information for the door and the second opening/closing state information of the door received from the door 30, and transmit the generated door state information to the server 40.

The door state information may include at least one of, for example, identification information of the electronic device of the user who changes the door opening/closing state and the opening/closing state of the door (for example, the opening state or the closing state).

For example, the electronic devices 100, 101, 102, and 103 may compare the first identification information for the door and the first opening/closing state information of the door received from the server 40 with the second identification information for the door and the second opening/closing state information of the door received from the door 30 to determine whether the information matches. When the information received from the server 40 matches the information received from the door 30, the electronic device 100, 101, 102, and 103 may generate door state information using a name of the user pre-stored in each of the electronic devices 100, 101, 102, and 103 and transmit the generated door state information to the server 40.

In operation ⑧, the door 30 may deactivate the second communication unit. For example, the door 30 may transmit the second identification information for the door and the second opening/closing state information of the door during a preset time (for example, for 1 to 2 minutes) through the second communication method and then end the transmission, and deactivate the second communication unit.

In operation ⑨, the electronic devices 100, 101, 102, and 103 may deactivate the second communication unit. For example, the electronic devices 100, 101, 102, and 103 may deactivate the second communication unit after transmitting the door state information to the server 40.

In operation ⑩, the server 40 may generate door state notification information on the basis of the door state information received from the electronic devices 100, 101, 102, and 103. The server 40 may identify the electronic device to receive door state notification information among the electronic devices 100, 101, 102, and 103 pre-configured to receive the door state notification information when the opening/closing state of the door is changed, and transmit the door state notification information to the identified electronic device.

In this case, since the server 40 receives the door state information from all the electronic devices 100, 101, 102, and 103 pre-configured to receive the notification information on the change in the opening/closing state of the door, the server 40 may determine that there is no electronic device to receive the door state notification information.

As described above, according to an embodiment of the present disclosure, the server 40 may identify the electronic device of the user who opened/closed the door, thereby removing inefficiency in which the notification of the opening/closing state of the door is transmitted to all the pre-registered electronic devices 100, 101, 102, and 103.

Figure 7:
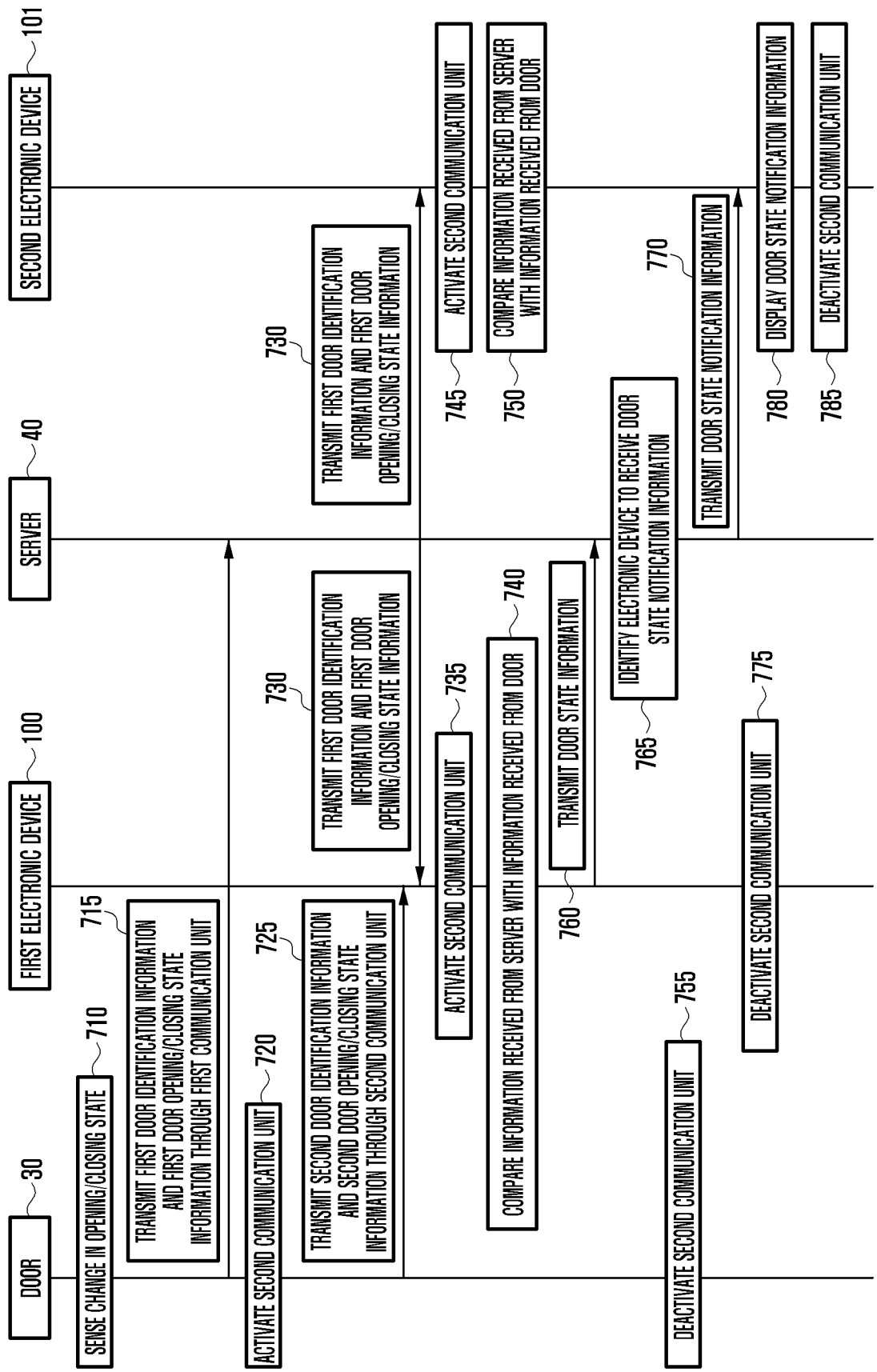
FIG. 7 is a flowchart illustrating a situation in which an electronic device related to a door of which an opening/closing state is changed is identified and information on the electronic device is transmitted to the server through a link between the electronic device, the door, and the server according to an embodiment.

FIG. 7 is a flowchart illustrating a situation in which an electronic device related to a door of which an opening/closing state is changed is identified and information on the electronic device is transmitted to the server through a link between the electronic device, the door, and the server according to an embodiment.

Referring to operation 710, the door 30 may sense a change in an opening/closing state of the door 30 by the user.

Referring to operation 715, the door 30 may transmit information related to the change in the opening/closing state of the door (for example, at least one piece of door identification information and door opening/closing state information) to the server 40. For example, the door 30 may transmit first identification information for the door and first opening/closing state information of the door to the server 40 by executing a first communication unit capable of performing the first communication method enabling long-distance communication.

Referring to operation 720, the door 30 may activate the second communication unit which has been in a deactivated state. For example, the door 30 may activate the second communication unit capable of performing the second communication method in response to generation of the change in the opening/closing state of the door 30 in operation 710.

Referring to operation 725, the door 30 may transmit second identification information for the door and second opening/closing state information of the door to the electronic device 100 through the second communication method. The second communication method may be, for example, a short-range communication method. Accordingly, the first electronic device 100 approaching the door 30 within a preset range may receive the second identification information for the door and the second opening/closing state information of the door from the door 30, and the second electronic device 101 located away from the door 30 beyond the preset range may not receive the second identification information for the door and the second opening/closing state information of the door from the door 30.

Referring to operation 730, the server 40 may transmit the received first identification information for the door and first opening/closing state information of the door to pre-registered electronic devices 100 and 101.

Referring to operation 735, the first electronic device 100 may activate the second communication unit, which has been in the deactivated state, in response to reception of the first identification information for the door and the first opening/closing state information of the door from the server 40.

Referring to operation 740, the first electronic device 100 may generate door state information on the basis of the first identification information for the door and first opening/closing state information of the door received from the server 40 and the second identification information for the door and the second opening/closing state information of the door received from the door 30. For example, when the information received from the server 40 is the same as the information received from the door 30, the electronic device 100 may generate door state information through a user's name pre-stored in the electronic device 100.

Referring to operation 745, the second electronic device 101 may activate the second communication unit, which has been in the deactivated state, in response to reception of the first identification information for the door and the first opening/closing state information of the door from the server 40.

Referring to operation 750, the second electronic device 101 may generate door state information on the basis of the information received from the server 40 and the information received from the door 30.

In this case, the second electronic device 101 may not receive the information from the door 30 and thus not generate the door state information.

Referring to operation 755, the door 30 may change the state of the second communication unit to the deactivated state after transmitting the second identification information for the door and the second opening/closing state information of the door for a preset time through the second communication unit.

Referring to operation 760, the first electronic device 100 may transmit the generated door state information to the server 40.

Referring to operation 765, the server 40 may generate door state notification information indicating the content of the change in the opening/closing state of the door on the basis of the received door state information. The server 40 may identify an electronic device to receive the door state notification information among the electronic devices 100 and 101 pre-configured to receive the notification of the door opening/closing state.

Referring to operation 770, the server 40 may transmit the door state notification information to the second electronic device 101 without transmitting it to the first electronic device 100 involved in the change in the state of the door 30 among the electronic devices 100 and 101 pre-configured to receive the door state notification information.

Referring to operation 775, the first electronic device 100 may change the state of the second communication unit to the deactivated state after transmitting the door state information to the server 40.

Referring to operation 780, the second electronic device 101 may display a notification indicating the state of the door 30 on a display through the door state notification information received from the server 40.

Referring to operation 785, the second electronic device 101 may change the state of the second communication unit to the deactivated state after receiving the door state notification information from the server 40.

Figure 8:
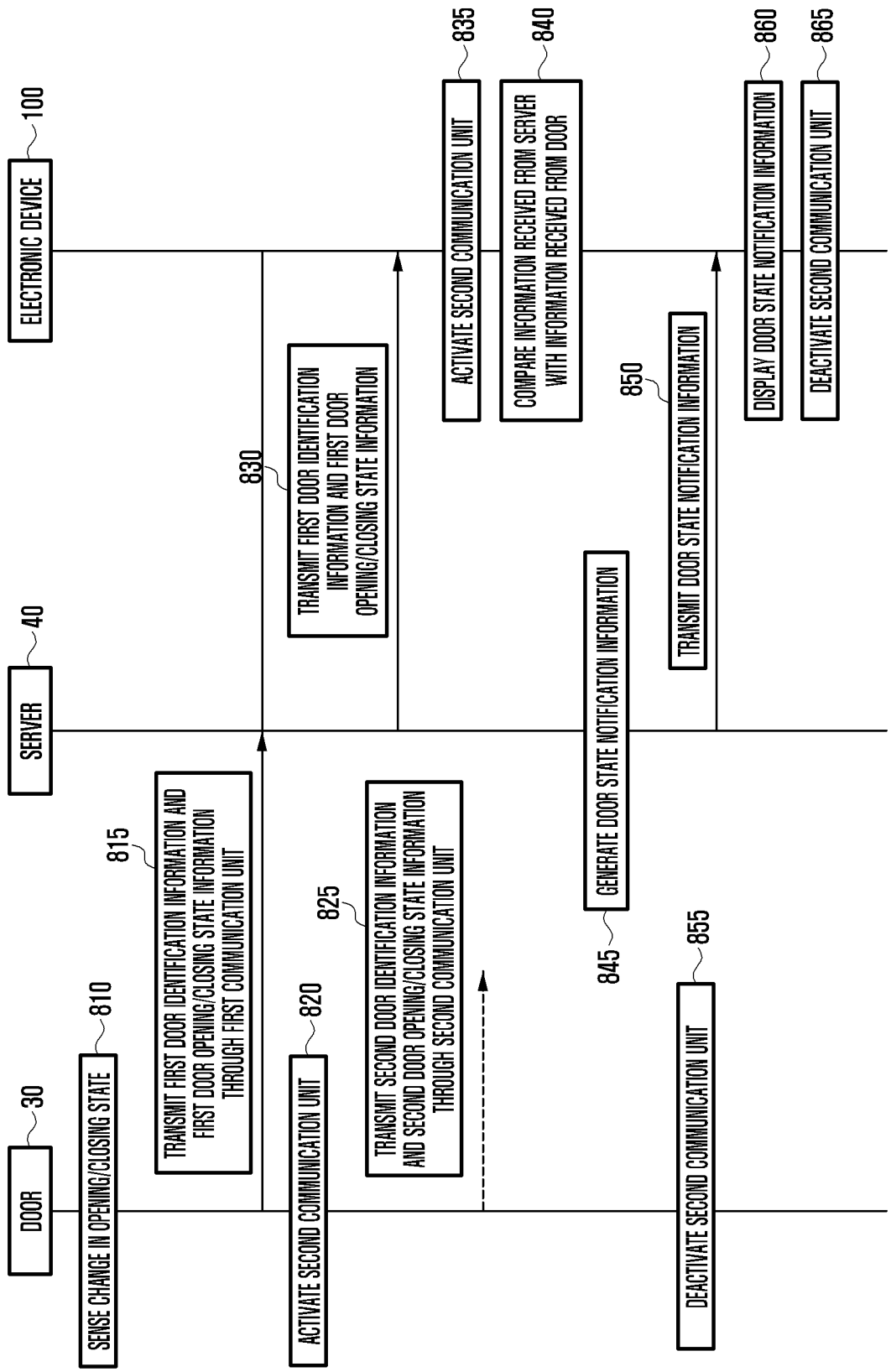
FIG. 8 is a flowchart illustrating informing of a situation in which door opening/closing is performed by a user who has not be registered through a link between the electronic device, the door, and the server according to an embodiment.

FIG. 8 is a flowchart illustrating a situation in which door opening/closing by a user who has not be registered is informed of through a link between the electronic device, the door, and the server according to an embodiment.

Referring to operation 810, the door 30 may sense a change in an opening/closing state of the door 30 by the user.

Referring to operation 815, the door 30 may transmit first identification information for the door and first door opening/closing state to the server 40.

Referring to operation 820, the door 30 may activate the second communication unit which has been in a deactivated state. For example, the door 30 may activate the second communication unit capable of performing the second communication method in response to generation of the change in the opening/closing state of the door 30 in operation 810.

Referring to operation 825, the door 30 may transmit second identification information for the door and second opening/closing state information of the door to the electronic device 100 through the second communication method. The second communication method may be, for example, a short-range communication method.

In this case, since the electronic device 100 is located away from the door 30 beyond a preset range, the electronic device 100 may not receive the second identification information nor the second opening/closing state information of the door.

Referring to operation 830, the server 40 may transmit the received first identification information for the door and first opening/closing state information of the door to the pre-registered electronic device 100.

Referring to operation 835, the electronic device 100 may activate the second communication unit, which has been in the deactivated state, in response to reception of the first identification information for the door and first opening/closing state information of the door from the server 40.

Referring to operation 840, the electronic device 100 may generate door state information by comparing the first identification information for the door and first opening/closing state information of the door received from the server 40 with the second identification information nor the second opening/closing state information of the door received from the door 30. In this case, the electronic device 100 may not generate the door state information since there is no information received from the door 30.

Referring to operation 845, the server 40 may generate door state notification information. For example, when the server 40 receives the first identification information for the door and the first opening/closing state information of the door from the door 30 and does not receive the door state information from the electronic device 100 for a preset time (for example, 1 to 2 minutes), the server 40 may identify that the opening/closing state of the door 30 is changed by a user, who has not been registered, and generate door state notification information corresponding to the door opening/closing by the non-registered user.

Referring to operation 850, the server 40 may transmit the door state notification information corresponding to the door opening/closing by the non-registered user to the electronic device 100.

Referring to operation 855, the door 30 may deactivate the second communication unit after transmitting the second identification information for the door and the second door opening/closing information for a preset time through the second communication unit.

Referring to operation 860, the electronic device 100 may display the received door state notification information on the display.

Referring to operation 865, the electronic device 100 may deactivate the second communication unit after receiving the door state notification information from the server 40.

Figure 9:
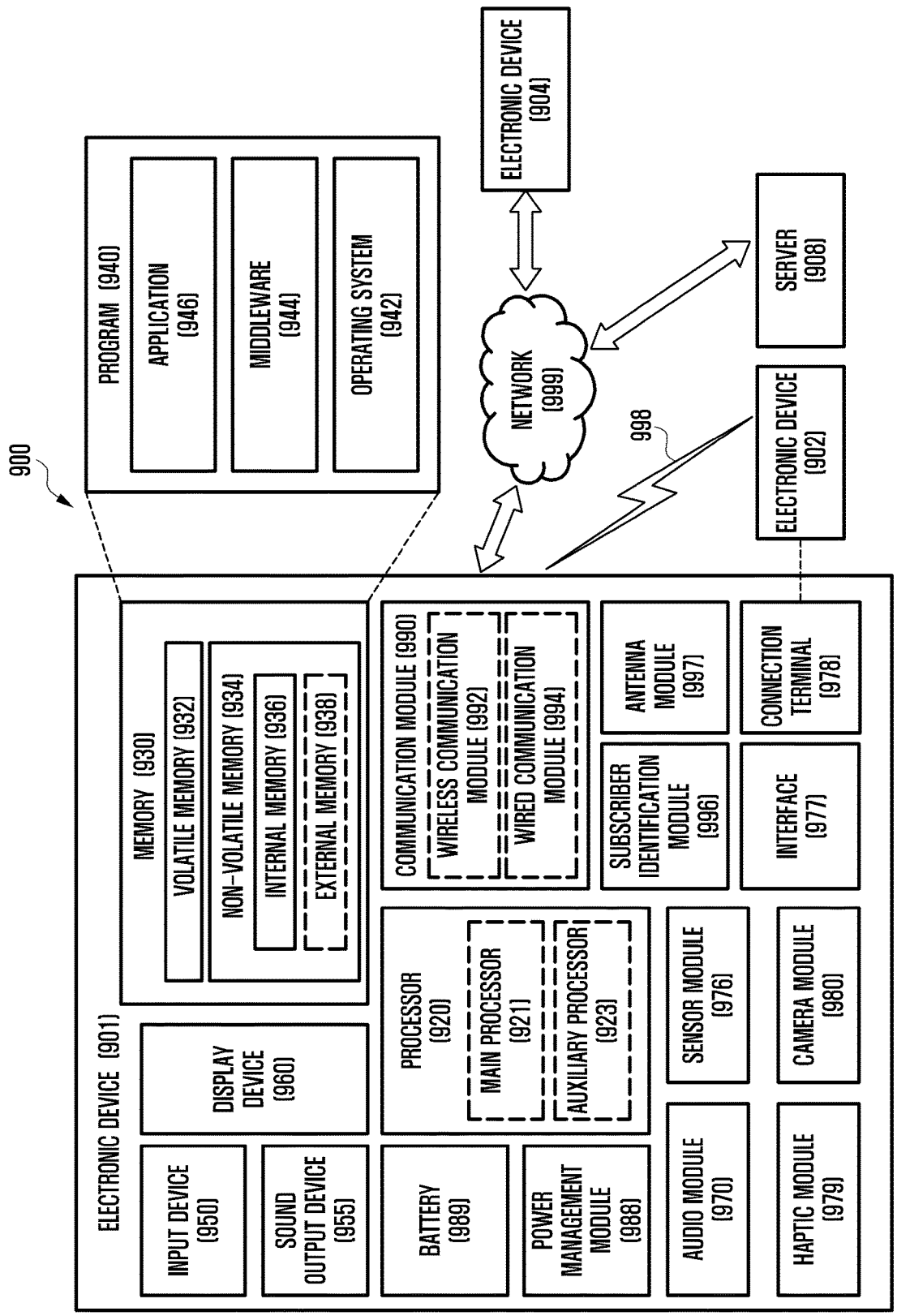
FIG. 9 is a block diagram illustrating an electronic device 901 within a network environment 900 according to various embodiments.

FIG. 9 is a block diagram illustrating an electronic device 901 within a network environment 900 according to various embodiments. The electronic device 901 may include the electronic device 100 of FIG. 1 and the electronic devices 101, 102, and 103 of FIG. 5. Referring to FIG. 9, the electronic device 901 may communicate with an electronic device 902 through a first network 998 (for example, short-range wireless communication) or communicate with an electronic device 904 or a server 908 through a second network 999 (for example, long-distance wireless communication) in the network environment 900. According to an embodiment, the electronic device 901 may communicate with the electronic device 904 through the server 908. According to an embodiment, the electronic device 901 may include a processor 920, a memory 930, an input device 950, a sound output device 955, a display device 960, an audio module 970, a sensor module 976, an interface 977, a haptic module 979, a camera module 980, a power management module 988, a battery 989, a communication module 990, a subscriber identification module 996, and an antenna module 997. In some embodiments, at least one of the elements (for example, the display device 960 or the camera module 980) may be omitted from or added to the electronic device 901. In some embodiments, in the case of the sensor module 976 (for example, a finger sensor, an iris sensor, or an illumination sensor) embedded into the display device 960 (for example, the display), some elements may be integrated.

The processor 920 may control at least one other element (for example, hardware or software element) of the electronic device 901 connected to the processor 920 by driving software (for example, the program 940) and perform various data processing and calculations. The processor 920 may load instructions or data received from another element (for example, the sensor module 976 or the communication module 990) to the volatile memory 932, process the loaded instructions or data, and store resultant data in the non-volatile memory 934. According to an embodiment, the processor 920 may include a main processor 921 (for example, a central processing unit or an application processor) and an auxiliary processor 923 (for example, a graphic processing unit, an image signal processor, a sensor hub processor, or a communication processor) operating independently from the main processor 921 and additionally or substantially using lower power than the main processor 921 or specified for a predetermined function. The auxiliary processor 923 may operate separately from the main processor 921 or while being embedded into the main processor 921.

In this case, for example, the auxiliary processor 923 may control at least some of the functions or states associated with at least one element (for example, the display device 960, the sensor module 976, or the communication module 990) among the elements of the electronic device 901, instead of the main processor 921, while the main processor 921 is in an inactive (for example, sleep) state or together with the main processor 921 while the main processor 921 is in an active (for example, application execution) state. According to an embodiment, the auxiliary processor 923 (for example, an image signal processor or a communication processor) may be implemented as a functionally relevant partial element of the other element (for example, the camera module 980 or the communication module 990). The memory 930 may store various pieces of data used by at least one element (for example, the processor 920 or the sensor module 976) of the electronic device 901, for example, software (for example, the program 940) and input data or output data on instructions related to the software. The memory 930 may include volatile memory 932 or non-volatile memory 934.

The program 940 is software stored in the memory 930 and may include, for example, an operating system 942, middleware 944, or an application 946.

The input device 950 is a device for receiving instructions or data to be used for the element (for example, the processor 920) of the electronic device 901 from the outside (for example, the user), and may include, for example, a microphone, a mouse, or a keyboard.

The sound output device 955 is a device for outputting a sound signal to the outside of the electronic device 901, and may include, for example, a speaker used for general purposes, such as playing multimedia or recording, and a receiver dedicated to receiving calls. According to an embodiment, the receiver may be formed to be integrated with the speaker or separately from the speaker.

The display device 960 is a device for providing visual information to the user of the electronic device 901, and may include, for example, a display, a hologram device, or a control circuit for controlling a projector and a corresponding device. According to an embodiment, the display device 960 may include a touch circuitry or a pressure sensor for measuring the strength of pressure of a touch.

The audio module 970 may bilaterally convert sound and an electronic signal. According to an embodiment, the audio module 970 may acquire a sound through the input device 950 or output a sound through the sound output device 955 or an external electronic device 902 (for example, the speaker or the headphones) connected to the electronic device 901 through a wire or wirelessly.

The sensor module 976 may generate an electric signal or a data value corresponding to an internal operation state (for example, power or temperature) or an external environment state of the electronic device 901. The sensor module 976 may include, for example, a gesture sensor, a gyro sensor, an atmospheric pressure sensor, a magnetic field sensor, an acceleration sensor, a grip sensor, a proximity sensor, a color sensor, an Infrared (IR) sensor, a biometric sensor, a temperature sensor, a humidity sensor, or an illumination sensor.

The interface 977 may support a predetermined protocol which can enable connection to an external electronic device (for example, the electronic device 902) wirelessly or through a wire. According to an embodiment, the interface 977 may include a High-Definition Multimedia Interface (HDMI), a Universal Serial Bus (USB) interface, an SD card interface, or an audio interface.

A connection terminal 978 may include a connector, which can physically connect the electronic device 901 and an external electronic device (for example, the electronic device 902), for example, an HDMI connector, a USB connector, an SD card connector, or an audio connector (for example, a headphone connector).

The haptic module 979 may convert an electric signal into mechanical stimulation (for example, vibration or motion) or electric stimulation, which the user recognizes through a sense of touch or kinesthesia. The haptic module 979 may include, for example, a motor, a piezoelectric element, or an electro-stimulator.

The camera module 980 may photograph a still image and a dynamic image. According to an embodiment, the camera module 980 may include one or more lenses, an image sensor, an image signal processor, or a flash.

The power management module 988 is a module for managing power supplied to the electronic device 901, and may be configured as at least part of a Power Management Integrated Circuit (PMIC).

The battery 989 is a device for supplying power to at least one element of the electronic device 901 and may include, for example, a primary cell, which is not rechargeable, a secondary cell, which is rechargeable, or a fuel cell.

The communication module 990 may support establishment of a wired or wireless communication channel between the electronic device 901 and an external electronic device (for example, the electronic device 902, the electronic device 904, or the server 908) or communication through the established communication channel. The communication module 990 may include one or more communication processors for supporting wired communication or wireless communication, operating independently from the processor 920 (for example, an application processor). According to an embodiment, the communication module 990 may include a wireless communication module 992 (for example, a cellular communication module, a short-range wireless communication module, or a Global Navigation Satellite System (GNSS) communication module) or a wired communication module 994 (for example, a Local Area Network (LAN) communication module or a power-line communication module), and may communicate with an external electronic device through a first network 998 (for example, a short-range communication network such as Bluetooth, Wi-Fi direct, or Infrared Data Association (IrDA)) or a second network 999 (for example, a long-distance communication network such as a cellular network, Internet, or a computer network (for example, a LAN or a WAN)) using one of the communication modules. The various types of communication modules 990 may be implemented by a single chip or separate chips.

According to an embodiment, the wireless communication module 992 may identify and authenticate the electronic device 901 within a communication network through user information stored in the subscriber identification module 996.

The antenna module 997 may include one or more antennas for transmitting a signal or power to the outside or receiving a signal or power from the outside. According to an embodiment, the communication module 990 (for example, the wireless communication module 992) may transmit a signal to an external electronic device or receive a signal from an external electronic device through an antenna suitable for a communication scheme.

Some of the elements may be connected to each other through a communication scheme between peripheral devices (for example, a bus, General Purpose Input/Output (GPIO), a Serial Peripheral Interface (SPI), or a Mobile Industry Processor Interface (MIPI)) and exchange signals (for example, instructions of data) therebetween.

According to an embodiment, instructions or data may be transmitted or received between the electronic device 901 and the external electronic device 904 connected to the second network 999 through the server 908. Each of the electronic devices 902 and 904 may be a device which is the same type as or a different type from that of the electronic device 901. According to an embodiment, all or some of the operations executed by the electronic device 901 may be executed by one or a plurality of external electronic devices. According to an embodiment, when the electronic device 901 performs some functions or services automatically or by a request, the electronic device 901 may make a request for at least some functions related thereto to an external electronic device instead of executing the functions or services by itself or additionally. The external electronic device receiving the request may execute a requested function or an additional function and transmit the result thereof to the electronic device 901. The electronic device 901 may provide the received result as it is, or may additionally process the received result to provide the requested functions or services. To this end, for example, cloud computing, distributed computing, or client-server computing technology may be used.

The term "module" used in the present disclosure may refer to, for example, a unit including one or more combinations of hardware, or hardware programmed with software. The "module" may be interchangeable with a term, such as "unit," "logic," "logical block," "component," "circuit," or the like. The "module" may be an integrated component or a part thereof for performing one or more functions. The "module" may be implemented mechanically or electronically. For example, the "module" according to an embodiment of the present disclosure may include at least one of an application-specific IC (ASIC) chip, a field-programmable gate array (FPGA), and a programmable-logic device for performing certain operations which have been known or are to be developed in the future.

Examples of computer-readable media include: magnetic media, such as hard disks, floppy disks, and magnetic tape; optical media such as compact disc ROM (CD-ROM) and DVD; magneto-optical media, such as floptical disks; and hardware devices that are specially configured to store and perform program instructions (e.g., programming modules), such as ROM, RAM, flash memory, etc. Examples of program instructions include machine code instructions created in assembly languages by a compiler, and code instructions created by a high-level programming language executable in computers using an interpreter, etc. The described hardware devices may be configured to act as one or more software modules in order to perform the operations and methods described above, or vice versa.

Modules or programming modules according to the embodiments of the present disclosure may include one or more additional components, or one or more of the components described above may be removed. The operations performed by modules, programming modules, or the other components, according to the present disclosure, may be executed in serial, parallel, repetitive or heuristic fashion. Part of the operations can be executed in any other order, skipped, or executed with additional operations.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    a first communication circuit and a second communication circuit;
    a processor; and
    a memory,
    wherein the memory includes instructions causing the processor to
    receive first identification information for a door and first opening/closing state information of the door from a server through the first communication circuit,
    receive second identification information for the door and second opening/closing state information of the door from the door through the second communication circuit,
    identify information on the electronic device involved in a change in an opening/closing state of the door based on the first identification information for the door, the first opening/closing state information of the door, the second identification information for the door, and the second opening/closing state information of the door, and
    control the first communication circuit to transmit door state information including the information on the electronic device involved in the change in the opening/closing state of the door to the server.

2. The electronic device of claim 1, wherein the memory includes instructions causing the processor to activate the second communication circuit when receiving the first identification information for the door and the first opening/closing state information of the door through the first communication circuit.

3. The electronic device of claim 1, wherein the memory includes instructions causing the processor to deactivate the second communication circuit when the door state information is transmitted to the server.

4. The electronic device of claim 1, further comprising a display,
    wherein the memory includes instructions causing the processor to control the display to display received door state notification information when receiving door state notification information indicating the change in the opening/closing state of the door from the server through the first communication circuit.

5. The electronic device of claim 4, wherein the memory includes instructions causing the processor to deactivate a second communication unit when receiving the door state notification information through the first communication circuit.

6. The electronic device of claim 1, wherein the first communication circuit performs long-distance wireless communication with the server and the second communication circuit performs short-range wireless communication with the door.

7. The electronic device of claim 4, wherein the memory includes instructions causing the processor to compare the first identification information for the door and the first opening/closing state information of the door with the second identification information for the door and the second opening/closing state information of the door, and
    identify information on the electronic device involved in the change in the opening/closing state of the door based on the compared result.

8. A method of operating an electronic device, the method comprising:
    receiving first identification information for a door and first opening/closing state information of the door from a server through a first communication circuit;
    receiving second identification information for the door and second opening/closing state information of the door from the door through a second communication circuit;
    identifying information on the electronic device involved in a change in an opening/closing state of the door based on the first identification information for the door, the first opening/closing state information of the door, the second identification information for the door and the second opening/closing state information of the door; and
    transmitting door state information including the information on the electronic device involved in the change in the opening/closing state of the door to the server through the first communication circuit.

9. The method of claim 8, wherein the identifying information on the electronic device comprises:
    comparing the first identification information for the door and the first opening/closing state information of the door with the second identification information for the door and the second opening/closing state information of the door, and
    identifying information on the electronic device involved in the change in the opening/closing state of the door based on the compared result.

10. The method of claim 8, further comprising activating the second communication circuit when the first identification information for the door and the first opening/closing state information of the door are received through the first communication circuit.

11. The method of claim 8, further comprising deactivating the second communication circuit when the door state information is transmitted to the server.

12. The method of claim 8, further comprising receiving door state notification information indicating the change in the opening/closing state of the door from the server and displaying the received door state notification information on a display.

13. The method of claim 12, further comprising deactivating the second communication circuit when the door state notification information is received through the first communication circuit.

* * * * *